US 6,573,982 B1

(12) United States Patent
Pruitt

(10) Patent No.: US 6,573,982 B1
(45) Date of Patent: Jun. 3, 2003

(54) METHOD AND ARRANGEMENT FOR COMPENSATING FOR FREQUENCY JITTER IN A LASER RADAR SYSTEM BY UTILIZING DOUBLE-SIDEBAND CHIRPED MODULATOR/DEMODULATOR SYSTEM

(75) Inventor: Philip Andrew Pruitt, San Diego, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 07/762,094

(22) Filed: Sep. 18, 1991

(51) Int. Cl.[7] .............................. G01C 3/08; G01S 13/08
(52) U.S. Cl. ...................... 356/5.01; 356/28.5; 342/132
(58) Field of Search ............................. 356/5.01, 28.5; 342/132

(56) References Cited

U.S. PATENT DOCUMENTS

| 3,549,256 A | * 12/1970 | Brienza et al. ................. 356/5 |
| 4,096,478 A | * 6/1978 | Chavez ........................ 342/132 |
| 4,666,295 A | * 5/1987 | Duvall, III et al. ............. 356/5 |
| 4,743,110 A | * 5/1988 | Arnaud et al. ................. 356/5 |
| 4,960,324 A | * 10/1990 | Schofield ....................... 356/5 |

* cited by examiner

*Primary Examiner*—Mark Hellner
(74) *Attorney, Agent, or Firm*—Colin M. Raufer; Leonard A. Alkov; Glenn M. Lenzen, Jr.

(57) ABSTRACT

A frequency jitter compensation radar system which frequency modulates a transmitter laser beam with simultaneously generated up- and down-chirped frequency modulated signals. The frequency modulated transmitter beam is used to scan a target and a reflected light beam is received for each pixel location of a radar system. The reflected light beam is heterodyned with a local oscillator laser beam and upon detection two separate electrical signal channels are provided representing tb up- and down-chirped frequency modulated signals. These up- and down-chirped signal channels are compressed and are further processed as the return signals of a radar system as by averaging the peak detection measurement from the two channels for each pixel to provide frequency jitter compensation commonly resulting from speckle from a target. Electro-optic or acoustic-optic arrangements may be used to frequency modulate the transmitter laser beam. Surface acoustic wave filters may be used for demodulation of the received signal channels. A method of implementing frequency jitter compensation for a radar system is disclosed.

27 Claims, 6 Drawing Sheets

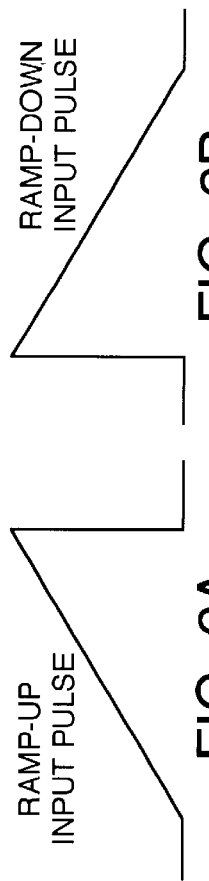
FIG. 6A
RAMP-UP INPUT PULSE
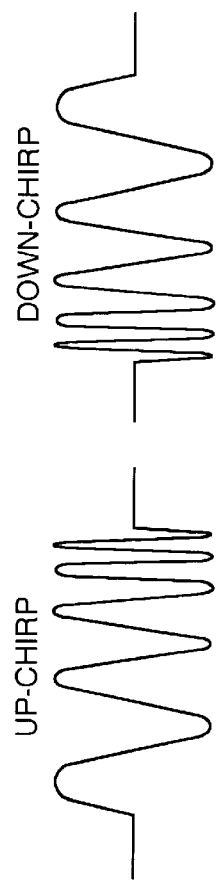
FIG. 6B
RAMP-DOWN INPUT PULSE
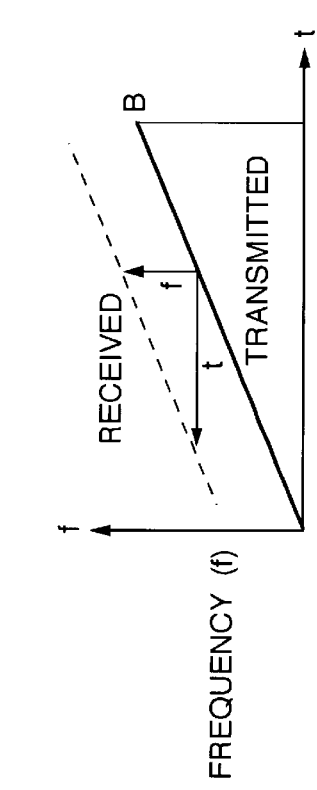
FIG. 7A
UP-CHIRP
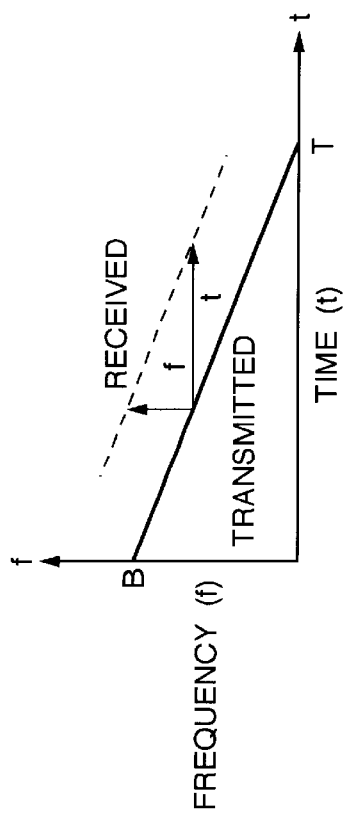
FIG. 7B
DOWN-CHIRP
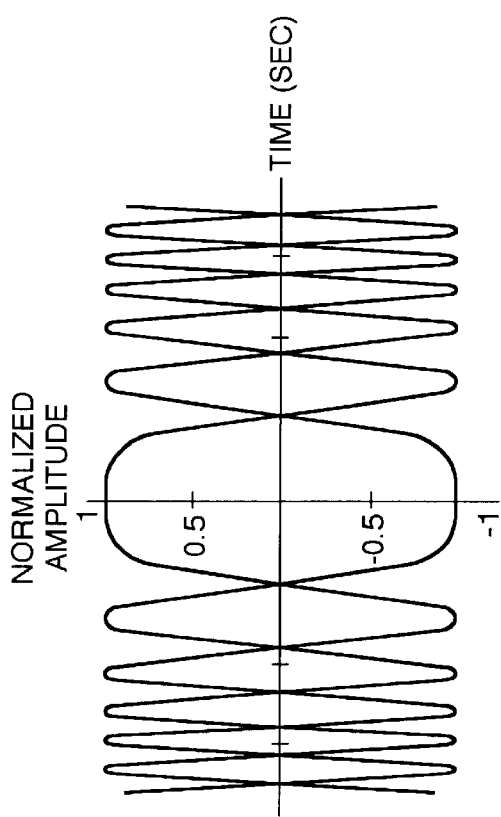
FIG. 8
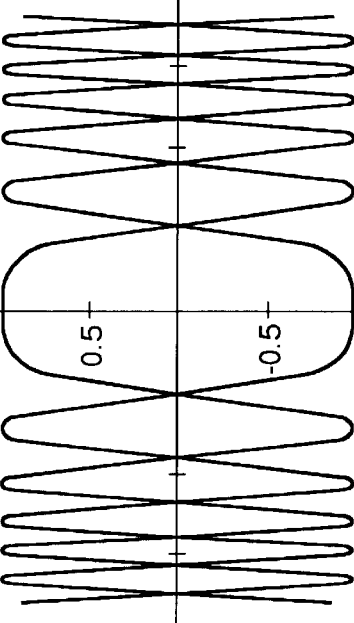
FIG. 4
UP-CHIRP
FIG. 5
DOWN-CHIRP

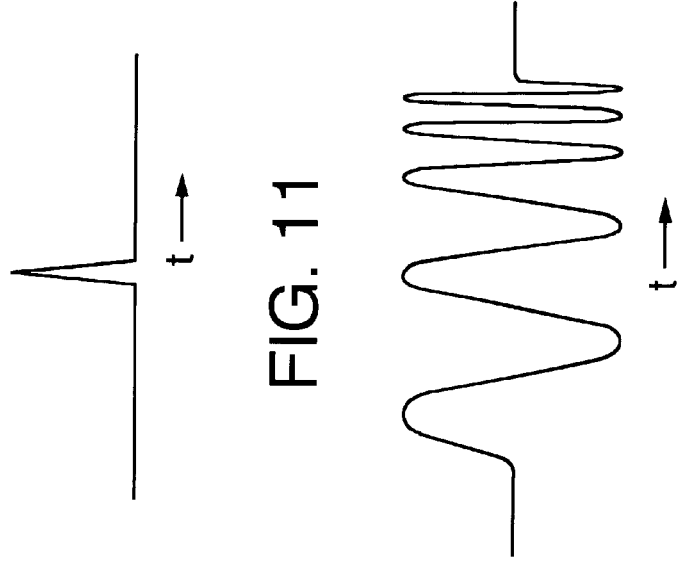
FIG. 11
FIG. 12
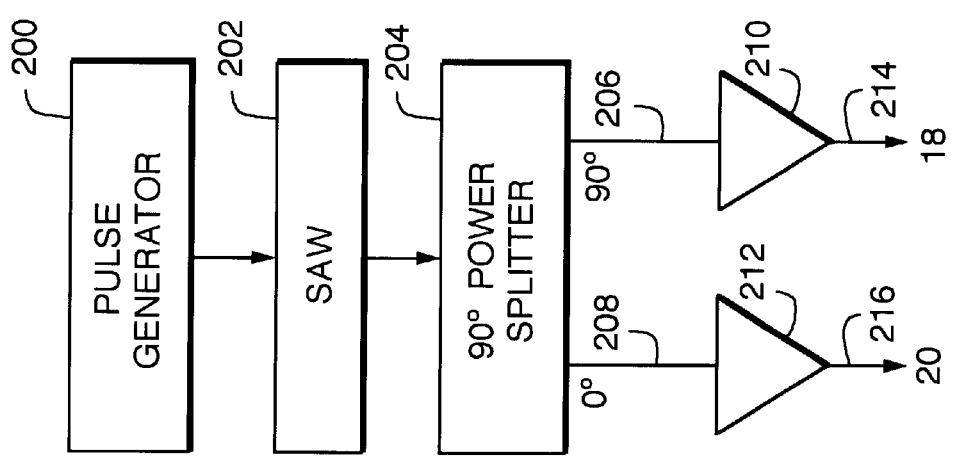
FIG. 10

METHOD AND ARRANGEMENT FOR COMPENSATING FOR FREQUENCY JITTER IN A LASER RADAR SYSTEM BY UTILIZING DOUBLE-SIDEBAND CHIRPED MODULATOR/DEMODULATOR SYSTEM

BACKGROUND OF THE INVENTION

1. Field of the Invention

This invention relates generally to an improvement in laser radar systems and more particularly, but not by way of limitation, to a method and arrangement for compensating for frequency jitter in a laser radar system by using a double-sideband chirped modulator/demodulator system.

2. Description of the Prior Art

Because of its resistance to jamming and interference from outside sources, and its superior range and angular accuracy, light has replaced electromagnetic energy in many applications including communications and measuring systems. Laser rangefinder techniques have been successfully shown to determine the ranges of targets at distances up to five miles with accuracy of 2 to 10 meters. As with conventional radar systems, laser systems may be classified into two basic categories: (1) direct, or incoherent detection, and (2) heterodyne or coherent detection.

The theory of the former dictates that the best signal-to-noise ratio is provided when the transmitted energy is concentrated into the shortest possible pulse. This yields a good range measuring and resolution capability. On the other hand, coherent detection requires highest possible average transmitted power for the best signal-to-noise ratio, irrespective of pulsed width. Also, accurate target radial velocity measurements can be obtained in the latter case.

It has long been known that radar resolution and accuracy are functions of the signal bandwidth, being AM or FM in nature, regardless of the transmitter waveform. Thus, a continuous power, or long pulse mode of operation heterodyne system, may also yield good range measuring and resolution capability when using a wideband signal. One technique for modulating a wideband signal is to frequency modulate the long pulse, and this has been termed a "chirped" signal and the associated receiver includes matched delay vs. frequency components to compress the return pulses. A more complex receiver is required to extract the wide band information available from this type of reflected signal, as opposed to the direct detection system. These receivers, as used in conventional radar systems, are designated as matched-filter signal processing receivers. The advantages of such signal processing techniques in radars are:

1. More efficient use of the average power available to the transmitter.
2. Increased system accuracy, both in the ranging and velocity measurements.
3. Reduction of jamming vulnerability.

Also in the past, a laser range finder using heterodyne detection and chirp pulse compression has been described. U.S. Pat. Nos. 4,662,741 and 4,666,295 describe such a system as a laser range finder using a wideband signal consisting of a linear FM chirp pulse of relative long duration. The matched filter at the receiver end is a Surface Acoustic Wave (SAW) device, which compresses the relative long FM chirp pulse into a narrow one (of the same bandwidth), from which the range and velocity information may be extracted. The duration of the compressed pulse is approximately the inverse of the bandwidth of the original signal. Thus, as the amount of frequency that is chirped increases, so does the resolution of the range and velocity measurements.

However, current radar systems which utilize single-sideband linear FM chirp modulation to provide target range measurements are susceptible to frequency jitter effects which are small random shifts in the return signal frequency produced by target/platform motion, laser frequency instabilities, or rapid beam scanning in the presence of diffuse target-induced speckle. Speckle relates to the problem of signal fluctuations of an imaging laser beam when reflected from an extended rough target surface. The dynamic speckle generated by the scan mechanism introduces additional frequency broadening which directly effects range precision of the system. Physically the signal fluctuations are caused by random constructive and destructive interference of wavelets from various scatterers on the target surface as the transmitted beam moves across the target surface during the finite period of receiver signal integration of each data pixel. In a radar system that uses a linear frequency modulation (FM) chirp followed by pulse compression at the receiver, the transmitted pulse width is normally a few microseconds during which the laser beam moves a substantial distance on the target surface. Substantial speckle phase variations are introduced in the received signal due to the relatively long dwell time of a single pixel. This effect becomes the dominant determinate of range precision for a high speed scanning system. Thus, it is apparent that a need exists for frequency jitter compensation in laser radar systems which utilize linear FM chirp modulation.

SUMMARY OF THE INVENTION

In accordance with the present invention, the range precision for long transmitter pulses such as for a linear FM chirp waveform is materially improved by transmitting an up and down linear chirp pair simultaneously and using a proper demodulation process. Thus, the linear portion of the speckle phase variations is automatically compensated and the range precision of the radar system is significantly improved.

An arrangement for accomplishing the above involves applying a double-sideband linear chirped waveform to a laser transmitter beam for frequency modulation accordingly. One sideband is a frequency up-chirp and the other is a frequency down-chirp. The modulation of transmitter may be by a suitable electro-optic device, such as a Bragg cell. The two chirped sidebands are preferably generated by employing up- and down-chirp surface acoustic wave (SAW) dispersive filters or by ramping two voltage controlled oscillators (VCO's). The reflected return beam is detected, after mixing with a local oscillator laser beam, and separated into two channels corresponding to each sideband and are then demodulated. Demodulation is preferably accomplished by using SAW dispersive delay filters to generate the compressed pulses.

Each of the demodulated pulses will be affected by frequency jitter, as described above, except that a frequency shift which advances the pulse in one channel will delay the pulse in the other channel by exactly the same amount. The compressed pulses are then input into suitable standard peak detection circuits for range-to-pixel measurements. Frequency jitter compensation is obtained by averaging the peak-detection readings from the two channels for each pixel. In addition, simultaneous, single pixel doppler information is extracted by taking the difference in the readings for the two channels.

Other features and attendant advantages of the present invention will become apparent to those skilled in the art from a reading of the following detailed description constructed in accordance with the accompanying drawings and wherein:

BRIEF DESCRIPTION OF THE DRAWINGS

FIG. 4 is a waveform that illustrates the effect of constant frequency shift on the up-chirp signal;

FIG. 5 is a waveform that illustrates the effect of constant frequency shift on the down-chirp signal;

FIGS. 6A and 6B illustrates the ramp-up input and ramp-down input for generating the up- and down-chirp signals in the arrangement of FIG. 2;

FIGS. 7A and 7B illustrate the VCO outputs for generating the up- and down-chirp signals in the arrangement of FIG. 2;

FIG. 8 is a waveform which illustrates the combining of the up- and down-chirp signal channels. This waveform is a double sideband chirped waveform and represents the envelop of a linear AM chirp modulation waveform.

DETAILED DESCRIPTION OF THE INVENTION

Figure 1:
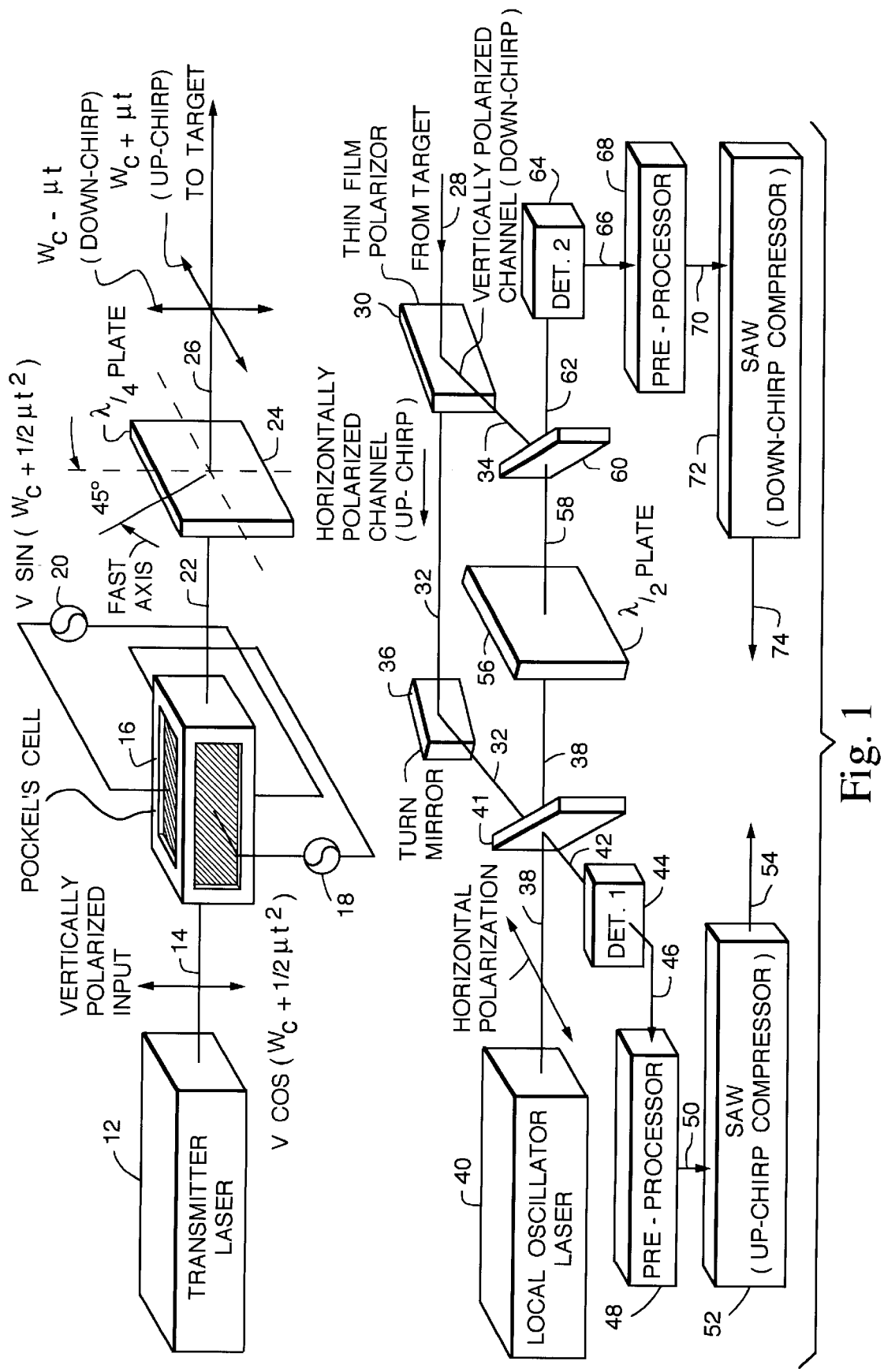
FIG. 1 illustrates a preferred embodiment of an arrangement for compensation for frequency jitter in a laser radar system which uses a double sideband chirped modulator/demodulator system that is constructed in accordance with the principles of the present invention.

Referring now to the drawings in detail and in particular to FIG. 1, the reference character 10 generally designates a frequency jitter compensating laser radar system constructed in accordance with a presently preferred embodiment of the present invention. The radar system 10 includes a transmitter laser 12 which emits an optical laser carrier beam 14 at a pre-established center frequency, in the range of 70 to 200 MHz. The light beam 14 is preferably vertically polarized.

A means is provided to frequency modulate the optical carrier beam 14 to provide a simultaneously up- and down-chirped frequency modulated transmitter light beam. In the illustrated preferred embodiment of the invention seen in FIG. 1, this means includes a suitable elctro-optic device 16 designed for FM modulation. A suitable electro-optic device would be a Pockel's cell having a (1, 1, 1) cut CdTs crystal such as made by the II–VI Inc. company of Saxonbury, Pa. The crystal is cut so that the (1, 1, 1) crystal axis is along the optical axis and is electroded for driving along two transverse orthogonal directions. The two driving voltages are out of phase by 90 degrees and are of amplitude sufficient to produce a half-wave relative phase change between the two orthogonal directions. The means for producing the two driving voltages are shown as 16 and 18 which are suitably electroded to the Pockel's cell 16. Preferably, these means to generate the two simultaneously up- and down-chirped sidebands employ up- and down-chirp SAW dispersive filters which were built by General Dynamics, Electronic Division, the construction of which is well known in the art.

In the illustrated configuration, the electro-acoustic device 16 acts as a spinning half-wave plate rotating at an angular velocity, Wr, equal to the driving frequency. The output 22 from the electro-acoustic device 16 is directed to a suitable quarter-wave plated 24 with fast axis of 45 degrees. The output 26 from the quarter-wave plate contains two components. The vertically polarized component is down shifted by a frequency of 2 Wr whiled the horizontally polarized component is upshifted by 2 Wr. Frequency modulation of the driving voltages is directly converted into frequency modulation of the optical carrier.

The frequency modulated transmitter laser beam is then directed toward a target for scanning thereof for each pixel location. The scanning of the target may generate dynamic speckle in the return beam 28 reflected from the target as previously described. The return beam 28 is then subjected to suitable demodulation. The return beam 28 is directed to a suitable thin firm polarizer 30 which separates the beam 28 into two channels corresponding to each sideband. The polarizer 30 permits the passage of a horizontally polarized beam 32 representing the channel for the up-chirp while it redirects a vertically polarized light beam 34 which represents the channel for the down-chirp. A suitable thin film polarizer is made by Laser Power Optics of Del Mar, Calif.

The horizontally polarized laser beam 32 may be turned by a suitable mirror 36 and combined with a local oscillator beam 38 having horizontal polarization emitted by a suitable local oscillator laser 40 at a suitable beam splitter device 40 to provide a combined beam 42. The combined beam 42 is incident upon a suitable detector 44 which converts the combined beam 42 into an electrical signal on lead 46 representative of the up-chirped channel. The lead 46 is connected to a suitable signal pre-processor 48. The output of the pre-processor appears on lead 50 which is connected to a suitable up-chirp compressor 52 which is preferably a suitable up-chirp surface acoustic wave (SAW) dispersive filter as is known in the art. The output of the up-chirp compressor 52 appears as a compressed electrical pulse on output lead 54 for further processing and analysis in the radar system.

The horizontally polarized laser local oscillator beam 38 is incident on a suitable quarter-wave plate 56 to provide a vertically polarized beam 58 which is direct to a suitable beam splitter 60 where it is combined with beam 34 to provide a combined beam 62 which is received by a suitable detector 64.

A detector 64 which converts the combined beam 62 into an electrical signal on lead 66 which is representative of the down-chirp channel. The lead 66 is connected to a suitable pre-processor 68 which is connected to a suitable down-chirp compressor 70 by lead 72. As before the down-chirp compressor 72 is preferably a suitable down-chirp surface acoustic wave (SAW) dispersive filter. The output of the down-chirp compressor 72 appears as a compressed electrical pulse on output lead 54 for further processing and analysis in the radar system.

Figure 3:
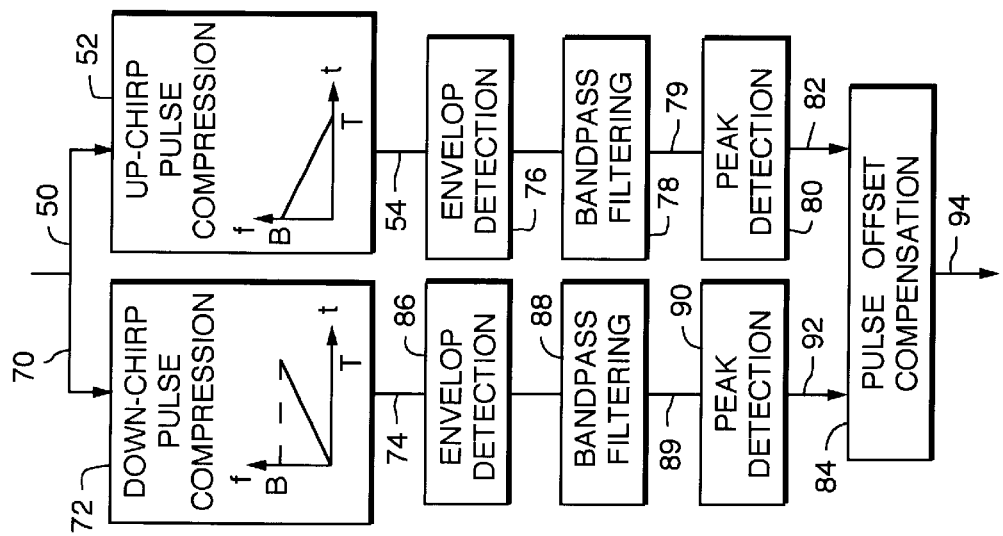
FIG. 3 is a simplified schematic which illustrates in greater detail the arrangement for demodulating the signal, as combined with the local oscillator beam, which is received from the target.

Referring now to FIG. 3, a typical demodulation process for further utilization of the compressed up-chirp pulse and down-chirp pulse will be described. The up-chirp electrical signal that appears on input 50 to the up-chirp pulse compressing circuit 50 will then appear as a compressed pulse on output 54. Similarly, the down-chirp electrical signal that appears on input 70 to the down-chirp compression circuit 72 will appear as compressed down-chirp pulse on output 74. Frequency jitter compensation will then be obtained by averaging the peak-detection readings from the two channels for each pixel. In addition, single pixel doppler information may be extracted by taking the difference in readings of the two channels. Accordingly, the output lead 54 is coupled to the envelope detection circuit 76 which is connected to the band pass filtering circuit 78 which in turn is connected to a suitable peak detection circuit 80 that develops an output pulse on lead 82. Lead 82 serves as the input for the up-chirp channel to a suitable pulse offset compensation 84. Similarly, the output lead 74 for the down-chirp channel is connected through similar envelop detection 86, bandpass filtering 88, and peak detection circuitry 90 to provide a down-chirp pulse channel output on lead 92 connected to the pulse offset compensation circuit 92.

Since any frequency jitter experienced will affect the demodulated pulses as previously described, a frequency shift will advance one pulse in one channel will delay the pulse in another channel by exactly the same amount. Thus, the output pulse that appears on the output 94 of the pulse offset compensation 84 will have compensated for any frequency jitter thereby significantly improving system range precision in a frequency jitter-limited laser radar system.

Reference will now be made to certain Figures which illustrate the waveforms involved in implementation of the present invention. I have found that speckle phase variations are dominated by the linear term. These linear phase variations correspond to frequency shifts which, after pulse compression, are converted to fixed offsets at the time of arrival. As seen in FIGS. 4 and 5, for a given frequency shift these offsets advance or lag behind the ideal time of arrival depending on whether an up-chirp or a down-chirp signal is transmitted. If the magnitudes of the two offsets from the up-chirp and down-chirp channels are identical but opposite in direction, their effects may be compensated and the true time of arrival, i.e., center of the two pulses, may be determined. This concept is realized in this present invention by transmitting up- and down-chirp pairs simultaneously. Accordingly, the laser beam sweeps across the target surface producing identical phase variations for each pulse pair.

Referring now to FIGS. 7A, 7B and 8, it will be seen that when an up-chirp and down-chirp having general waveforms as seen in FIGS. 7A and 7B, are simultaneously generated and combined in a double-sideband chirped waveform, as seen in FIG. 8, results. This waveform could also be termed a linear AM chirp modulation waveform. The transmitter laser beam when modulated by the electro-optic device 16 of FIG. 1 will be frequency modulated accordingly so that the radar beam which scans the target will be thus modulated so that the return beam may be demodulated in accordance with the present invention to provide frequency jitter compensation.

The pulses that appear on the inputs 82 and 92 to the pulse offset compensation circuit 92 of FIG. 3 are shown added together in FIG. 3 to determine the true range of the target. As seen the speckle phase effect on the compressed up- and down-chirp pulses will cause compensation offsets.

Figure 2:
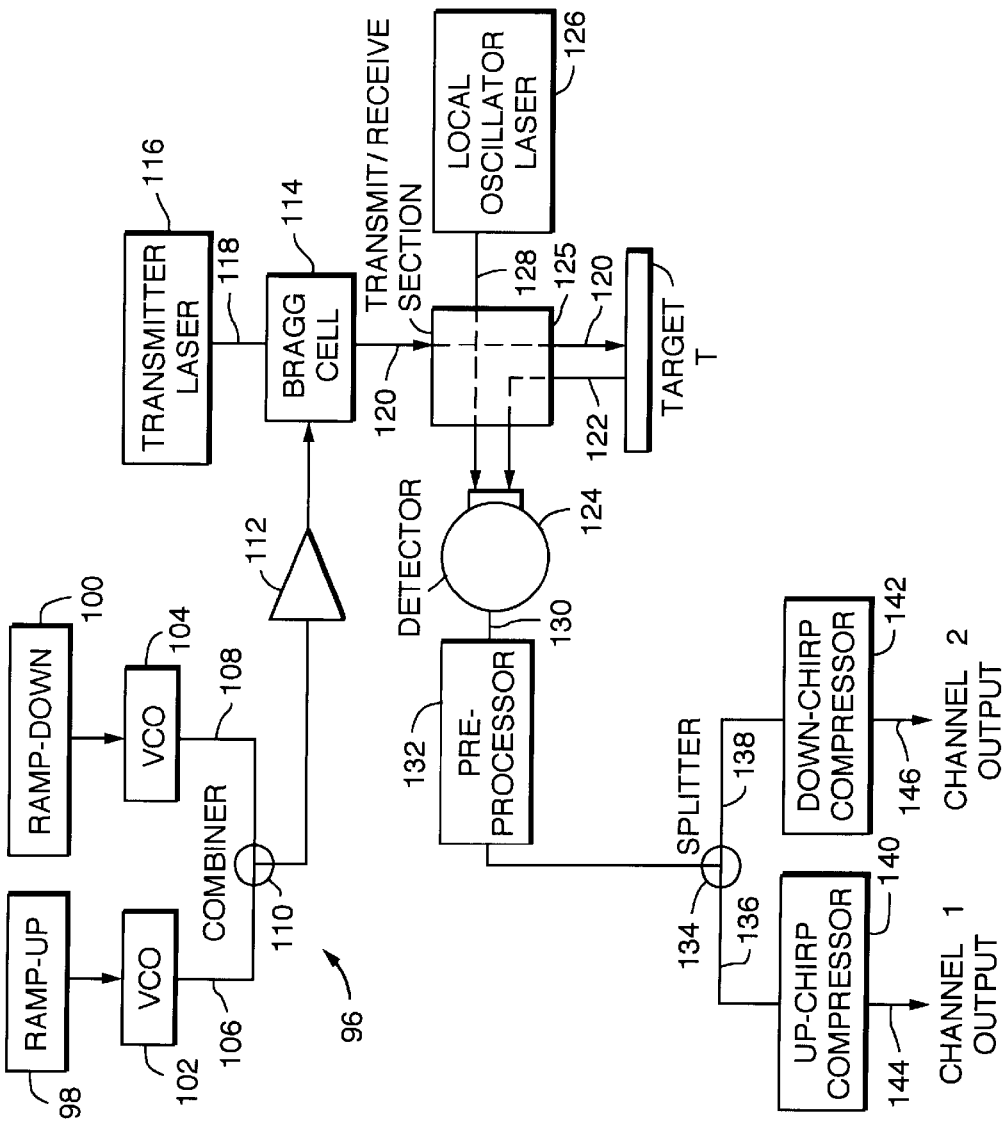
FIG. 2 is a simplified schematic which illustrates a second embodiment of the invention.
Figure 9:
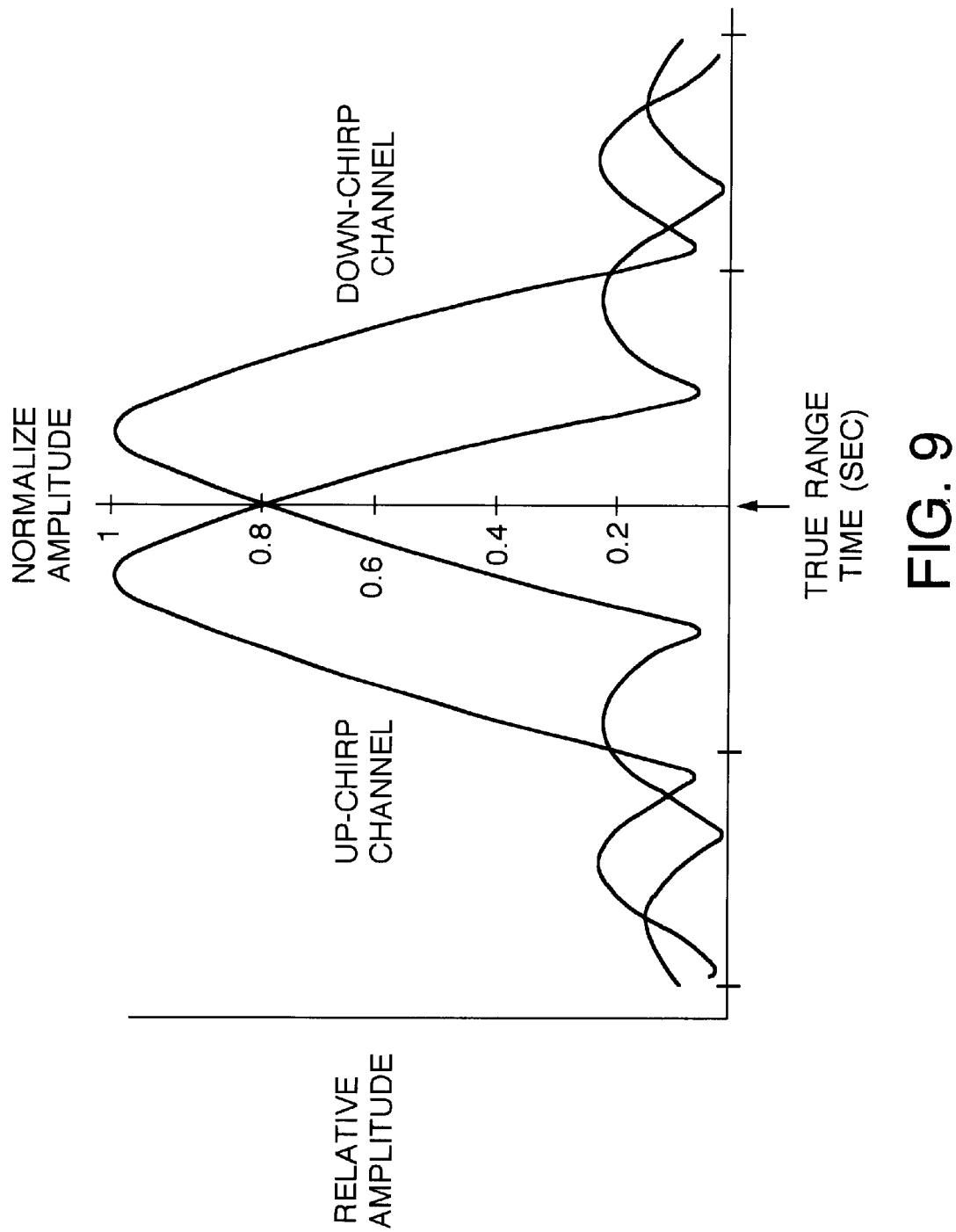
FIG. 9 represents the speckle phase effect on the compressed pulses for an up- and down-chirp pair whereby the true range of a target may be determined.
Figure 13:
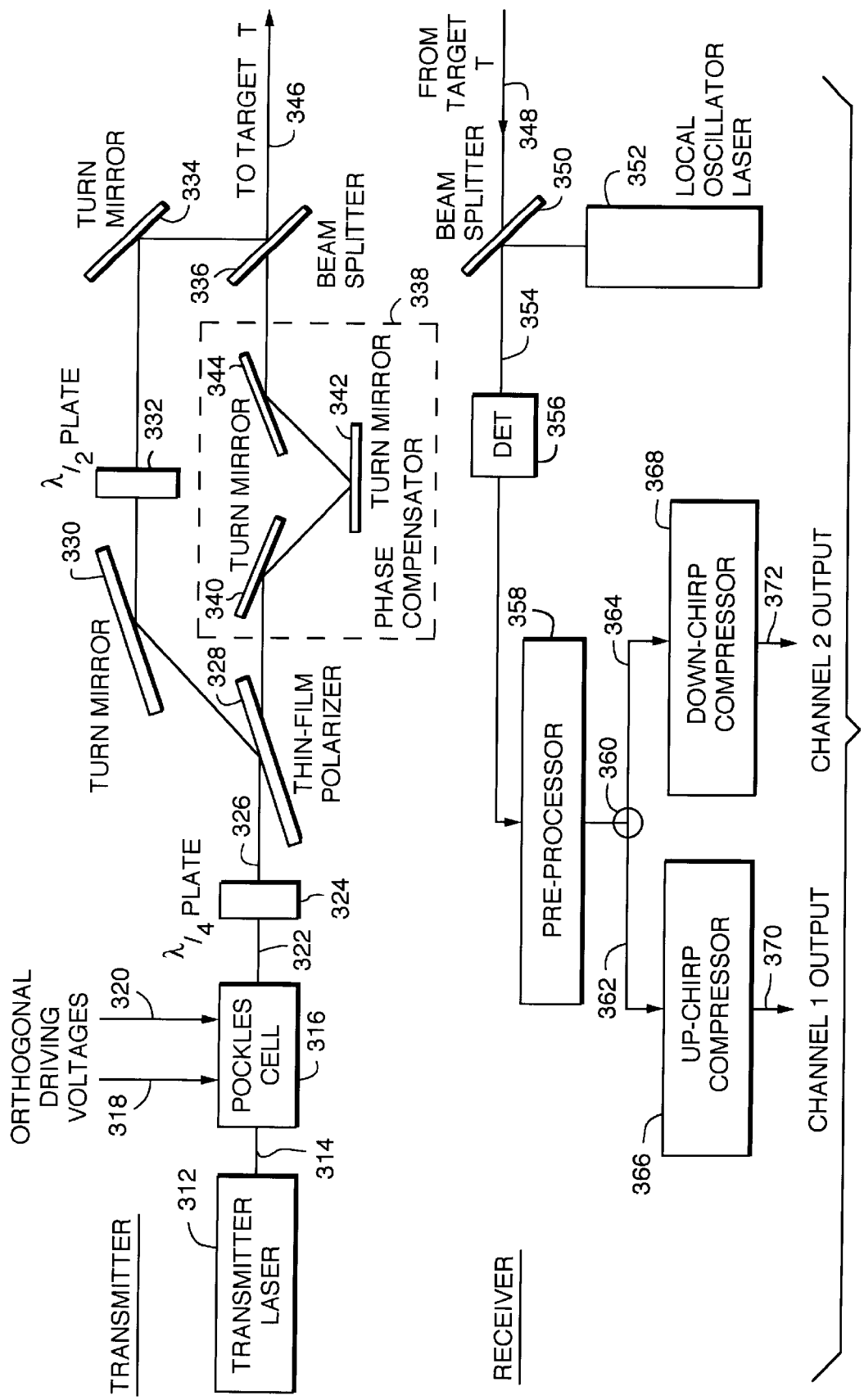

While FIG. 1 illustrated an embodiment of the invention which utilized an electro-optic device to frequency modulate the transmitter laser beam, the invention would also contemplate the use of an acoustic-optic device to modulate the carrier laser beam. FIG. 2 illustrates an alternative embodiment of the invention which has been so constructed. In FIG. 2, another embodiment 96 utilizes ramp-up and ramp-down generators 98 and 100, as made by Wavetek of San Diego, Calif. to generate simultaneously the ramp-up and ramp-down pulses seen in FIGS. 6A and 6B. These ramp-up and ramp-down pulses are simultaneously applied to the inputs of suitable voltage controlled oscillators (VCO's). Such VCO's are made by Vectron Labs. Inc. of Norwalk, Conn. The up-chirp and down-chirp signals, as seen in FIGS. 7A and 7B appear respectively on inputs 106 and 108 of a suitable combiner 110 to provide a double-sideband chirped waveform seen in FIG. 8. The output of the combiner 110 is suitably amplified by amplifier 112, the output of which is applied to a suitable acoustic-optic device 114 which also receives incident light from a transmitter laser 116 which emits a laser beam 118 which is incident to the acousto-optic device 114. The acousto-optic device 114 may be a Bragg cell which is well known in the art and which frequency modulates the laser light beam in accordance with the electrical signal seen in FIG. 8 to provide a frequency modulated laser beam 120 which is transmitted through a suitable transmit/receive section 122 to scan a target T with a modulated laser pulse for each pixel location. A typical Bragg cell is Model AOM 100 made by Phillips Research Labs., Redhill, Surrey, England.

The return beam 127 which is reflected from the target and which may have frequency jitter induced by target speckle is directed by transmit/receive section 122 to a suitable detector 124. A local oscillator laser 126 emits a continuous wave local oscillator beam 128 that has a center frequency offset from the center frequency of the carrier beam 118 by a predetermined amount. The heterodyne detector 124 detects the combined beam of the local oscillator 126 and the return beam and creates an electrical signal on output 130 that is then pre-processed by a suitable pre-processor 132 before being outputted to splitter 134 where it is split into an up-chirp channel signal on output 136 and a corresponding down-chirp channel signal on output 138. The up-chirp signal on output 138 is then compressed by a suitable up-chirp compressor circuit 140 while the down-chirp signal is similarly compressed by a suitable down-chirp compressor 142. Suitable chirp compressors are typically surface acoustic wave (SAW) filters such as made by Anderson Laboratories of Bloomfield, Conn.

The present invention as achieved a bandwidth of 25 Mhz and it is believed that a bandwidth of over 100 Mhz is easily achievable with present technology. The preferred chirp slope for the present implementation is 5.6E-3 Mhz/nsec while using a center frequency of 87 Mhz for the carrier laser beam.

In summary, a method and arrangement for frequency jitter compensation for a laser radar range system has been described. The invention has shown how a pair of up- and down-chirp pulses are simultaneously generated and are used to frequency modulate a laser transmitter beam. A frequency modulated laser pulse scans a target and the return pulse for a pixel location may contain target induced speckle. Demodulation of the pulse provides frequency jitter compensation by the frequency offset compensation provided by the pair of compressed up- and down-chirp pulses which are then used for further processing and analysis.

Changes may be made in the combination and arrangement of parts or elements as heretofore set forth in the specification and shown in the drawings. As evidenced by the differences between the embodiments of the invention of FIGS. 1 and 2 in which electro-optic and acoustic-optic devices were illustrated as frequency modulating the transmitter laser beam and several methods of generating the up- and down-chirp signals, it is to be understood that changes may be made in the precise embodiment disclosed without departing from the spirit and scope of the invention as defined in the following claims.

I claim:

1. A frequency jitter-compensating laser radar system comprising:
   a transmitter laser which emits an optical carrier beam at approximately a pre-established or center frequency;
   a means to frequency modulate the optical carrier beam to provide a simultaneously up- and down-chirped frequency modulated transmitter light beam;
   transmit/receive means to transmit the modulated light beam toward a target for scanning thereof and to receive a reflected return beam for each pixel location of a radar system;
   a local oscillator laser which emits a laser beam for combining with the reflected return beam to form a combined beam;
   detector means which detects the combined light beam and creates a resultant electrical signal representing the combined beam;
   means to split the resultant electrical signal into channels representing the up- and down-chirped frequency modulated electrical signals; and
   means receiving the two channels and compressing the up- and down-chirped electrical signals for use as the return signals from the radar for further processing analysis.

2. The frequency jitter-compensating laser radar system of claim 1 wherein the means to frequency modulate the optical carrier beam includes means to generate up- and down-chirped signals by generating two driving voltages that are out of phase by 90 degrees.

3. The frequency jitter-compensation laser radar system of claim 2 wherein the modulating means includes an electro-optic device designed for frequency modulation which is adapted to have the two driving voltages applied for driving along two transverse orthogonal directions whereby the electro-optic device acts as a spinning half-wave plate rotating at an angular velocity equal to the driving frequency.

4. The frequency jitter-compensation radar system of claim 3 wherein the modulating means further includes a quarter-wave plate with a fast angle at an angle of 45 degrees which receives the output of the electro-optic device and that transmits the optical carrier which has been modulated to have a vertically polarized component that has been downshifted by 2 Wr and a horizontally polarized component that has been upshifted by 2 Wr whereby frequency modulation of the driving voltages may be directly converted into frequency modulation of the frequency carrier.

5. The frequency jitter-compensation laser radar transmitter/receiving system of claim 4 wherein the transmit/receive means to receive the laser beam that has been reflected from the target and to combine it with the local oscillator laser beam includes polarizer means which separates the laser beam reflected from the target into a horizontally polarized channel and into a vertically polarized channel, which channels are combined with the local oscillator laser beam for application to the detector means.

6. The frequency jitter-compensating laser radar system of claim 5 wherein the up- and down-chirp compressive means includes a dispersive delay filter providing a surface acoustic wave (SAW) device to produce an up-chirp and down-chirp compressed electrical pulses to be used as input pulses for radar return signal processing.

7. The frequency jitter-compensating laser radar transmitting/receiving system of claim 5 wherein the output of the transmitting laser is polarized in one direction while the output of the local oscillator laser is polarized in a direction that is orthogonally disposed 90 degrees from the polarization of the transmitting laser.

8. The frequency jitter-compensating laser radar system of claim 1 which further includes peak detection means which receives the compressed up and down chirp output signals and develops peak detection measurements for each channel for range-to-pixel measurements.

9. The frequency-jitter compensating laser radar transmitting/receiving system of claim 8 wherein frequency jitter compensation for the received signal is obtained by averaging the peak detection measurements for each channel for each pixel.

10. A frequency jitter-compensating laser radar system comprising:
    a transmitter laser which emits an optical carrier beam of light at approximately a pre-established or center frequency;
    beams to generate a linear frequency up-chirped signal;
    means to generate a linear frequency down-chirped signal
    means to combine the frequency up- and down-chirped signals into a single drive pulse;
    a modulating means adapted to be coupled to the combining means and to receive the optical carrier beam of light emitted by the transmitter laser to apply a corresponding modulation to the optical carrier beam in response to the drive pulse prior to the optical carrier beam being directed toward a target for a predetermined pixel location;
    a continuous wave local oscillator laser which emits a beam of light having a second pre-established frequency;
    means to receive the modulated optical carrier beam reflected by the target and to combine it with the local oscillator beam received from the continuous wave local oscillator laser;
    a heterodyne detector means which collects and focuses the combined light beam and creates a resultant electrical signal representing the combined beam
    means to split the resultant electrical signal into two channels representing the up- and down-chirped signals;
    up-chirp compressor means coupled to the splitter means for receiving one channel to produce an up-chirp compressed pulse to be used as an input pulse for radar return signal processing; and
    down-chirp compressor means coupled to the splitter means for receiving the other channel to produce a down-chirp compressed pulse to be used as an input pulse for radar signal processing.

11. The frequency jitter-compensating laser radar system of claim 10 wherein the means to generate a linear frequency up-chirped signal includes a means to generate an up-ramped signal pulse that is applied to a voltage controlled oscillator(VCO), nd the means to generate a down-ramped signal pulse that is applied to a voltage controlled oscillator (VCO).

12. The frequency jitter-compensating laser radar system of claim 10 wherein the modulating means includes an acoustic-optic device which receives the drive signal and applies a corresponding modulation to the optical carrier beam.

13. The frequency jitter-compensating laser radar system of claim 10 which further includes an amplifying means that is coupled to the combining means and to the acoustic-optic device for amplifying the drive signal prior to application to the acoustic-optic device.

14. The frequency jitter-compensating laser radar system of claim 1 wherein the laser radar system transmits and receives a modulated laser pulse for each pixel location as the target is scanned.

15. The method of operating a frequency jitter-compensating laser radar system comprising the steps of:

actuating a transmitter radar to emit a laser light beam at approximately a preselected center frequency;

frequency modulating the transmitter laser light beam to provide a simultaneously up- and down-chirped frequency modulated transmitter light beam;

transmitting the frequency modulated laser beam as the radar beam toward a target;

receiving the reflected laser return beam from the transmitted laser beam and splitting the return beam into two light beam channels representing an up-chirp channel and a down-chirp channel;

heterodyning each of the two light beam channels with a laser beam from a local oscillator laser;

detecting the beam of each channel to create two electrical signals;and compressing each up- and down-chirped electrical signal to provide two electrical signals for use as the return signals from the radar beam for further processing and analysis.

16. The method of claim 15 which further includes the step of creating up- and down-chirped signals by actuating the transmitter laser to emit a laser light beam having a predetermined direction of polarization and directing the polarized transmitter beam through an electro-optic device for frequency modulation of the transmitter laser light beam.

17. The method of claim 16 wherein frequency modulation of driving voltages applied in two transverse orthogonal directions to the electro-optical device to frequency modulate the transmitter laser beam to provide a double-sideband linear chirped waveform having a frequency up-chirp and a frequency down-chirp.

18. The method of claim 17 wherein the reflected return signal from the transmitted laser beam is passed through a polarizing means to provide a horizontally polarized channel and a vertically polarized channel.

19. The method claim 17 wherein the light beam of each channel is passed though surface acoustic wave (SAW) filter means to create two electrical signals.

20. The method of claim 19 wherein the modulated radar beam scans the target and a return beam is received for each pixel location of a radar system.

21. The method of claim 19 wherein the two electrical signals are combined to provide frequency jitter compensation for each pixel location of a radar system.

22. The method of operating a frequency jitter-compensating laser radar system comprising the steps of:

actuating a transmitter laser to emit a laser light beam at approximately a preselected center frequency;;

frequency modulating the transmitter laser light beam to provide a simultaneously up- and down-chirped frequency modulated transmitter laser beam;

transmitting the modulated transmitter laser beam as the radar beam toward a target;

receiving the reflected return beam from the transmitted laser beam and heterodyning it with a laser beam from a local oscillator laser to form a combined beam;

detecting the combined beam to create an electrical signal representing the combined beam;

splitting the electrical signal representing the combined beam into two electrical signals representing the up-chirped and the down-chirped signals; and compressing the up- and down-chirped electrical signals to provide two electrical signals representing the up- and down-chirped signals and using said signals as the return signal from the radar for processing and analysis.

23. The method of claim 22 wherein linear frequency up- and down-chirped electrical signals are combined into a single pulse which is used as the drive signal for an acoustic-optic means for frequency modulating the transmitter laser light beam to provide a simultaneously up- and down-chirped frequency modulated transmitter laser beam.

24. The method of claim 23 wherein the up- and down-chirped electrical signals are obtained by simultaneously applying up- and down-ramped signal pulses to the inputs of voltage controlled oscillators (VCO's) to generate said up- and down-chirped electrical signals.

25. The method of claim 24 wherein the modulated radar beam scans the target and a return beam is received for each pixel location of a radar system.

26. The method of claim 25 which further includes the step of averaging the peck-detection measurements of the two electrical signals representing the up- and down-chirped signal channels for each pixel location to provide frequency jitter compensation.

27. A frequency jitter compensation radar system which includes means to frequency modulate a transmitter laser beam with simultaneously generated up- and down-chirped frequency modulated signals and means to demodulate the modulated transmitter laser beam after it has been reflected from a target said reflected laser beam is separated into separate channels representing the up- and down-chirped signals whereby any speckle introduced into the reflected beam from scanning the target is compensated for by the offsetting processed up- and down-chirped signal channels.

* * * * *